No. 884,949. PATENTED APR. 14, 1908.
J. M. OWENS.
STONE SAWING MACHINE.
APPLICATION FILED MAR. 7, 1907.
3 SHEETS—SHEET 1.
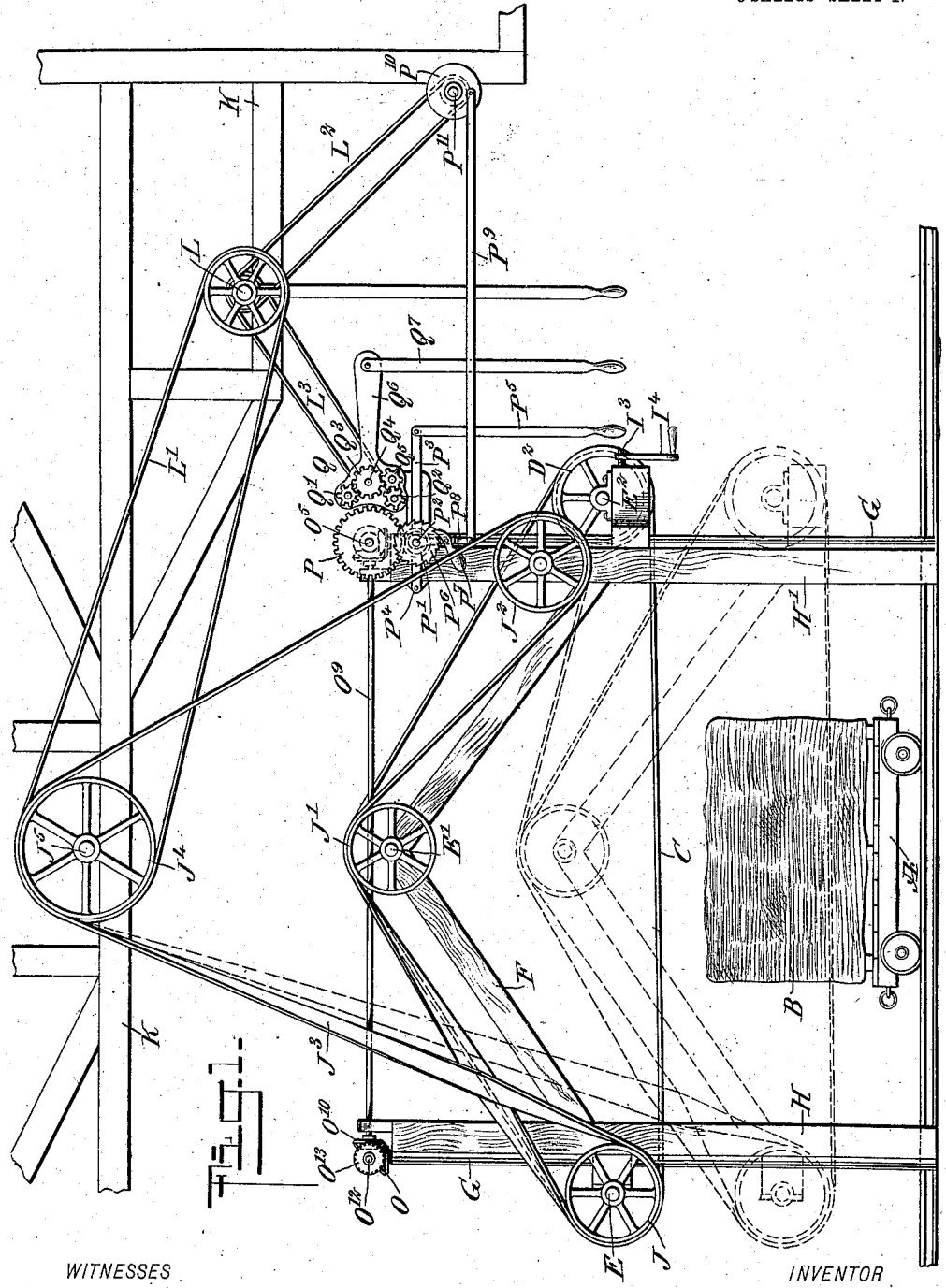
WITNESSES
INVENTOR
John M. Owens
BY
ATTORNEYS No. 884,949. PATENTED APR. 14, 1908.
J. M. OWENS.
STONE SAWING MACHINE.
APPLICATION FILED MAR. 7, 1907.
3 SHEETS—SHEET 2.
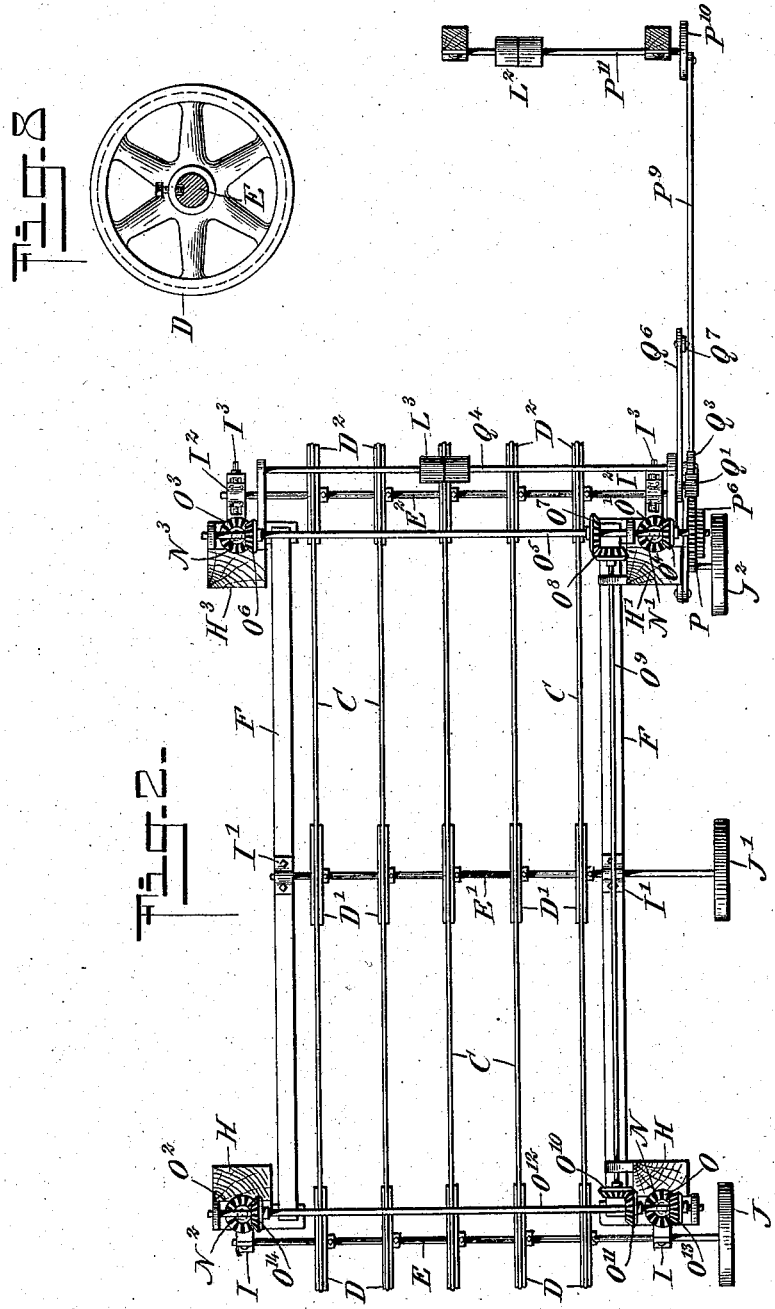
WITNESSES
INVENTOR
John M. Owens
BY
ATTORNEYS

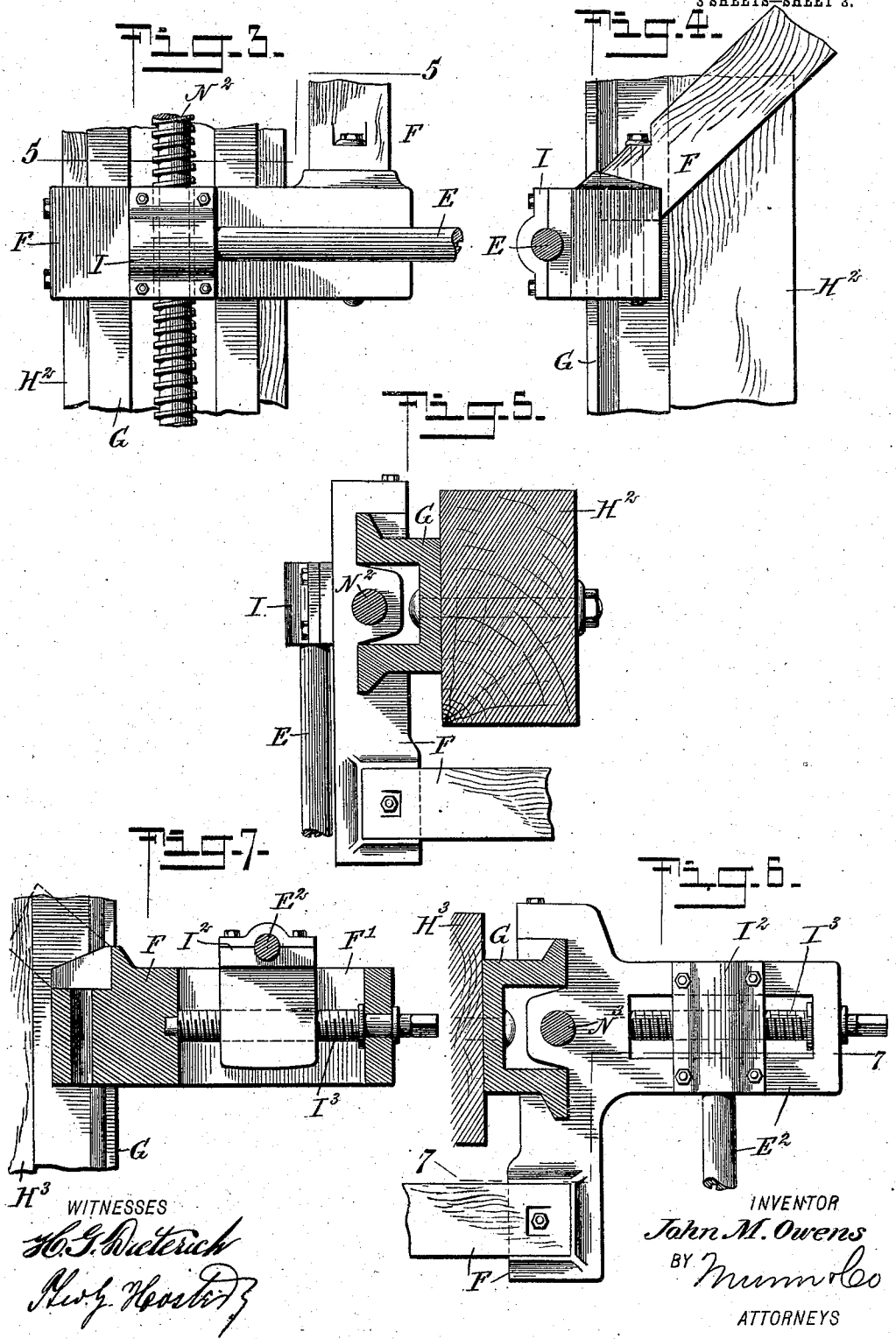

UNITED STATES PATENT OFFICE.

JOHN MANUEL OWENS, OF OOLITIC, INDIANA, ASSIGNOR TO JOHN M. OWENS, OF OOLITIC, INDIANA, AND JOHN A. ROWE, OF BEDFORD, INDIANA, JOINTLY.

STONE-SAWING MACHINE.

No. 884,949.        Specification of Letters Patent.        Patented April 14, 1908.

Application filed March 7, 1907. Serial No. 361,021.

*To all whom it may concern:*

Be it known that I, JOHN MANUEL OWENS, a citizen of the United States, and a resident of Oolitic, in the county of Lawrence and State of Indiana, have invented a new and Improved Stone-Sawing Machine, of which the following is a full, clear, and exact description.

The invention relates to stone working, and its object is to provide a new and improved stone sawing machine which is simple and durable in construction, very effective in operation, and provided with wire saws for cutting a stone quickly and accurately into a series of slabs of the desired thickness.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is a plan view of the same, the overhead drive being omitted; Fig. 3 is an enlarged end view of part of the carriage and the feeding mechanism for the same; Fig. 4 is a side elevation of the same; Fig. 5 is a sectional plan view of the same, on the line 5—5 of Fig. 3; Fig. 6 is an enlarged sectional plan view of a part of the carriage and the means for tensioning the saw; Fig. 7 is a sectional side elevation of the same, on the line 7—7 of Fig. 6, and Fig. 8 is an enlarged side elevation of one of the grooved pulleys for the wire saw.

On a car A or other suitable support rests the stone B to be sawed into slabs by the use of wire saws C, each in the form of an endless wire passing around a set of grooved pulleys D, D', D² secured on transversely extending shafts E, E', E², held on a carriage F, preferably in the form of two triangularly-shaped side frames, mounted to slide up and down on guide-ways G arranged on posts H, H', H², H³, erected on the ground or floor. The endless wire saws C are arranged in vertical parallel planes, spaced distances apart corresponding to the thickness of the slabs to be cut from the stone B, and the said endless wire saws C are in the form of triangles, the base runs of which form the cutting portion and engage and cut into the stone on the downward feeding of the carriage F.

In order to give the desired tension to the endless wire saws C the shafts E, E' are journaled in bearings I, I' fixed to the carriage F, while the shaft E² is journaled in bearings I² (see Figs. 2, 6 and 7) mounted to slide longitudinally on guideways F' formed on the carriage F. In the bearings I² screw longitudinally extending screw rods 13 mounted to turn in guideways F' and adapted to receive at their outer ends a crank arm I⁴ (see Fig. 1), adapted to be turned by the operator, for turning the screw rods I³ to move the bearings I² towards or from the posts H', H³, with a view to tighten or loosen the wire saws C, to give the desired tension to the same.

In order to impart a traveling motion to the several endless saws C, the following arrangement is made: On the shafts E and E' are secured the belt pulleys J, J', and a belt pulley J² is journaled on the post H', and around the said pulleys J, J', J² passes a belt J³ also passing over a pulley J⁴ secured on a shaft J⁵ journaled in suitable bearings arranged on an overhead framework K, as plainly indicated in Fig. 1. The shaft J⁵ driven by a suitable belt L' from the main shaft L, is connected with other machinery for imparting a continuous rotary motion to the shaft L, so that the shaft J⁵ is rotated and the belt J³ is caused to rotate, and also the pulleys J, J', J², whereby the shafts E and E' are driven. Now as the grooved pulleys D, D' are secured on the shafts E, E', it is evident that a traveling motion is given to the several wire saws C.

In order to feed the carriage F slowly downward for the lower runs of the wire saws C to cut into the stone B, the following arrangement is made: On the posts H, H', H² and H³ are journaled vertically disposed screw rods N, N', N², N³ screwing in the carriage F, and provided at their upper ends with bevel gear wheels O, O', O², O³, of which the bevel gear wheel O' is in mesh with a bevel gear wheel O⁴ (see Fig. 2), secured on a transversely extending shaft O⁵ journaled in suitable bearings arranged on the upper ends of the posts H', H³. On the shaft O⁵ is secured a bevel gear wheel O⁶ in mesh with the bevel gear wheel O³, so that when the shaft O⁵ is rotated a turning motion is given to the screw rods N', N³. On the shaft O⁵ is also secured another bevel gear wheel O⁷ in mesh with a bevel gear wheel O⁸ secured on a longitudinally extending shaft O⁹ journaled in suitable bearings arranged on the upper ends of the posts H and H'. On the shaft O⁹ is secured a bevel gear wheel O¹⁰ in mesh with a bevel gear wheel O¹¹ secured on a transversely extending shaft O¹² journaled in suitable bearings arranged on the upper ends of the posts H and H². On the shaft O¹² are secured the bevel gear wheels O¹³ and O¹⁴ in mesh with the bevel gear wheels O and O², respectively, to rotate the screw rods N and N² simultaneously and in unison with the screw rods N', N³, owing to the gearing above described and shown in Fig. 2.

On the shaft O⁵ is secured a gear wheel P in mesh with a pinion P' secured on a short shaft P² journaled in a lever P³ fulcrumed at P⁴ on the post H' and provided with a handle P⁵ under the control of the operator, for imparting a swinging motion to the lever P³, so as to move the pinion P' in or out of mesh with the gear wheel P. When the carriage F is to be fed downward the pinion P' is in mesh with the gear wheel P, but when it is desired to impart a quick return movement of the carriage F or a quick downward movement of the same, the lever P³ is swung downward to move the pinion P' out of mesh with the gear wheel P and to then engage the gear wheel P with a quick drive Q likewise under the control of the operator and hereinafter more fully described. On the shaft P² carrying the pinion P' is secured a ratchet wheel P⁶ engaged by a pawl P⁷ fulcrumed on an arm P⁸ mounted to swing loosely on the shaft P² as a fulcrum, the said arm P⁸ being pivotally connected with a pitman P⁹ connected with a crank disk P¹⁰ secured on a shaft P¹¹ journaled on the overhead framework K and driven by a pulley and belt device L² from the main shaft L.

Now when the machine is in operation and the pinion P' is in mesh with the gear wheel P, then the crank disk P¹⁰ and the pitman P⁹ impart a forward and backward swinging motion to the arm P⁸, which by the pawl P⁷ intermittently turn the ratchet wheel P⁶, and consequently the shaft P² and the pinion P', to intermittently turn the gear wheel P and the shaft O⁵, which by the gearing above described causes a simultaneous turning of the several screw rods N, N', N², N³, to slowly feed the carriage F in a downward direction.

The quick drive Q previously mentioned consists of pinions Q', Q², of which the pinion Q' is in mesh with a gear wheel Q³ secured on a shaft Q⁴ adapted to be driven from the main shaft L by a pulley and belt drive L³, and the said gear wheel Q³ is in mesh with an intermittent gear wheel Q⁵ in mesh with the pinion Q², so as to rotate the latter in an opposite direction to that given to the pinion Q'. The pinions Q', Q² and the gear wheel Q⁵ are mounted on a lever Q⁶ held to rock on the shaft Q⁴ and provided with a handle Q⁷ under the control of the operator, to enable the latter to impart a swinging motion to the lever Q⁶, so as to throw either of the pinions Q' or Q² in mesh with the gear wheel P. Now when the pinion Q' is in mesh with the gear wheel P then a quick downward feeding is given to the carriage F, and when the pinion Q² is in mesh with the gear wheel P then a quick return or upward feeding movement is given to the carriage. It is understood that when the quick drive Q is used, the slow intermittent feed is out of action and vice versa.

The operation is as follows: When the several parts are in the position as illustrated in Fig. 1, and the main shaft L is rotated, then the carriage F is gradually fed downward and a continuous traveling motion is given to the several wire saws C, so that the lower runs of the latter finally come into contact with the top of the stone B, to cut into the same in a downward direction as the feeding of the carriage F proceeds. Now by the arrangement described the fast moving wire saws C readily cut with their lower runs into the stone B, so as to divide the same into slabs of desired thickness, it being understood that the several wire saws C are spaced corresponding distances apart. When the stone B has been cut into the several slabs, the operator pulls the handle P⁵ downward so as to disengage the pinion P' from the gear wheel P, and then the operator pulls the handle Q⁷ downward, so as to move the pinion Q² in mesh with the gear wheel P, to cause a return or upward feeding of the carriage F to move the base runs of the wire saws C upward out of engagement with the cuts previously made in the stone B.

From the foregoing it will be seen that by the use of traveling endless wire saws arranged in the manner described stone is quickly sawed into the desired number of slabs of the required thickness.

It is also understood that any desired number of wire saws C may be used, that is, one, two or more, according to the nature of the work in hand.

The stone sawing machine shown and described is very simple and durable in construction and very effective in operation.

Having thus described my invention, I claim as new and desire to secure by Letters Patent:

1. A sawing machine, comprising a supporting frame, a triangular carriage mounted to slide vertically in the frame, three horizontal shafts mounted in the carriage, one at the apex of the carriage and the other two at the base, one of the shafts at the base being adjustable, pulleys on the shafts, an endless wire passing over the pulleys, belt pulleys on two of the shafts, an idler belt pulley on the frame, an overhead driven pulley, a belt passing around said pulleys, mechanism for feeding the carriage slowly downward, and mechanism for imparting a quick movement to the carriage in either direction.

2. A sawing machine provided with grooved pulleys arranged one relative to the other to form a triangle, an endless cutting wire passing over the said pulleys, the portion of the wire between the adjacent base pulleys being the cutting portion and for engagement with the material to be cut, a carriage mounted to travel up and down and on which the shafts of the said grooved pulleys are journaled, belt pulleys secured on two of the said shafts, an idler belt pulley journaled adjacent to the third grooved pulley shaft, an overhead driven pulley, and a belt passing over the said belt pulleys.

3. A sawing machine provided with grooved pulleys arranged one relative to the other to form a triangle, an endless cutting wire passing over the said pulleys, the portion of the wire between the adjacent base pulleys being the cutting portion and for engagement with the material to be cut, a carriage mounted to travel up and down and on which the shafts of the said grooved pulleys are journaled, belt pulleys secured on two of the said shafts, an idler belt pulley journaled adjacent to the third grooved pulley shaft, an overhead driven pulley, a belt passing over the said belt pulleys, and means for feeding the said carriage in a downward direction.

In testimony whereof I have signed my name to this specification in the presence of two subscribing witnesses.

JOHN MANUEL OWENS.

Witnesses:
JENNIE DIERKING,
MAY KERN.